US008705503B2

(12) United States Patent
Yang et al.

(10) Patent No.: US 8,705,503 B2
(45) Date of Patent: Apr. 22, 2014

(54) APPARATUS AND METHOD OF AUTOMATICALLY PROVISIONING A FEMTOCELL

(75) Inventors: Chen-Yui Yang, Marlboro, NJ (US); Paritosh Bajpay, Edison, NJ (US); David H. Lu, Morganville, NJ (US); Balaji R. Puli, San Ramon, CA (US); Anthony M. Srdar, Gainesville, GA (US); Xidong Wu, Livermore, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 365 days.

(21) Appl. No.: 12/951,534

(22) Filed: Nov. 22, 2010

(65) Prior Publication Data

US 2012/0127975 A1     May 24, 2012

(51) Int. Cl.
*H04W 92/00* (2009.01)
*H04W 8/04* (2009.01)

(52) U.S. Cl.
USPC ........... 370/338; 370/230; 370/312; 370/310; 370/352; 370/331; 455/411; 455/435.1; 455/456.1

(58) Field of Classification Search
CPC ..... H04W 92/02; H04W 92/04; H04W 92/12; H04W 92/20; H04W 8/04; H04W 8/08; H04W 8/26; H04W 72/10; H04W 72/005; H04W 72/042

USPC ................ 370/338, 230, 312, 310, 352, 331; 455/411, 435.1, 456.1
See application file for complete search history.

(56) References Cited

U.S. PATENT DOCUMENTS

| | | | |
|---|---|---|---|
| 7,844,728 B2 * | 11/2010 | Anderson et al. | 709/233 |
| 2005/0002353 A1 | 1/2005 | Horneman | |
| 2007/0298788 A1 * | 12/2007 | Corson et al. | 455/433 |
| 2008/0076419 A1 | 3/2008 | Khetawat et al. | |
| 2009/0129263 A1 * | 5/2009 | Osborn | 370/230 |
| 2009/0279430 A1 | 11/2009 | Huber et al. | |
| 2009/0323632 A1 * | 12/2009 | Nix | 370/331 |
| 2010/0035601 A1 | 2/2010 | Chen et al. | |
| 2010/0077459 A1 * | 3/2010 | Mahdi et al. | 726/4 |
| 2010/0235688 A1 * | 9/2010 | Bennah et al. | 714/57 |
| 2010/0265823 A1 * | 10/2010 | Zhao et al. | 370/233 |

* cited by examiner

*Primary Examiner* — Charles C Jiang
*Assistant Examiner* — Jamal Javaid
(74) *Attorney, Agent, or Firm* — Guntin & Gust, PLC; Ralph Trementozzi

(57) ABSTRACT

A system that incorporates teachings of the present disclosure may include, for example, a femtocell having a controller operable to establish communications with a gateway and transmit authentication information to the gateway. The gateway transmits the authentication information and a gateway identifier to a remote server to authenticate the femtocell. The controller is also operable to detect enablement of services responsive to the remote server identifying a subscriber account according to the gateway identifier, and the remote server authenticating the femtocell by comparing the authentication information to information retrieved from the subscriber account. Other embodiments are disclosed.

21 Claims, 9 Drawing Sheets

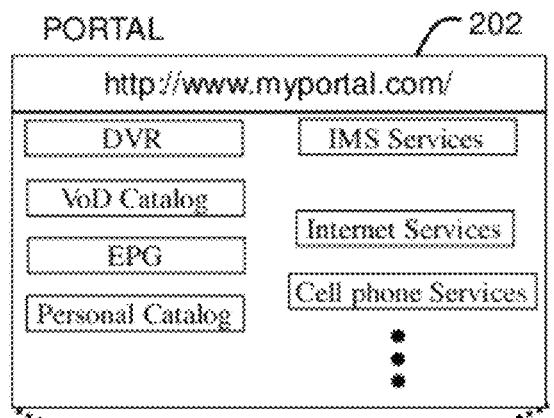
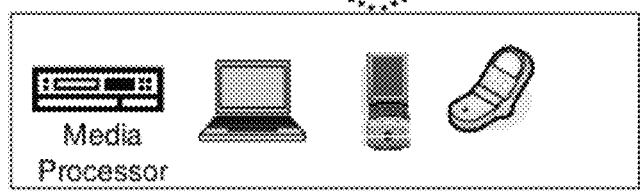
FIG. 2
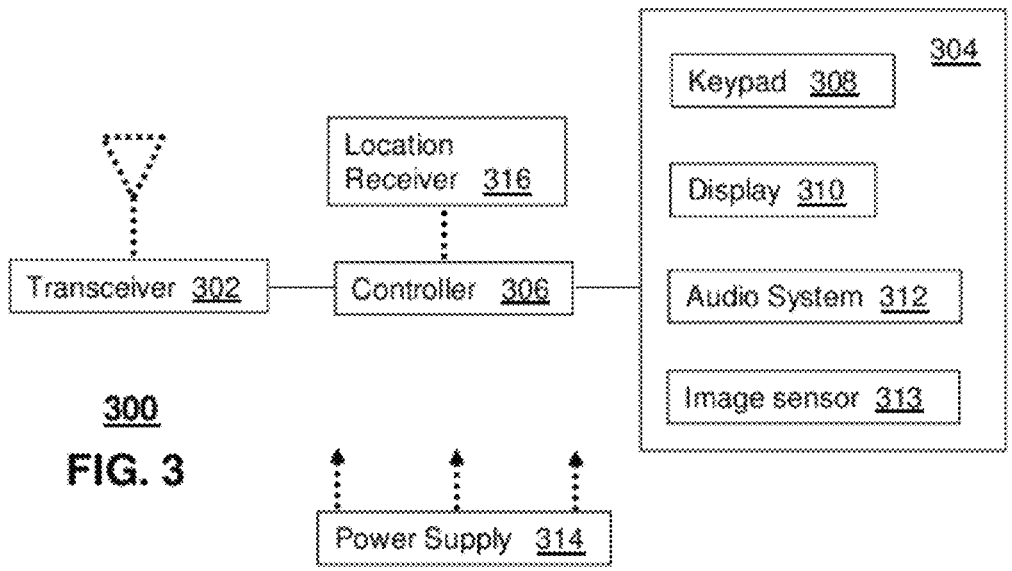
FIG. 3

400 FIG. 4

APPARATUS AND METHOD OF AUTOMATICALLY PROVISIONING A FEMTOCELL

FIELD OF THE DISCLOSURE

The present disclosure relates generally to femtocells and more specifically to an apparatus and method of automatically provisioning a femtocell.

BACKGROUND

Provisioning a femtocell on to a broadband network is generally deployed to improve indoor wireless coverage provided by a wireless network operator. Although femtocells exists that offer "plug-and-play" installations on certain networks, the complication and problems that arise due to various services and networks are not fully contemplated by existing systems. Having subscribers install and provision their own femtocells can further complicate deployment and even cause degradation to a network rather than improve it.

BRIEF DESCRIPTION OF THE DRAWINGS

FIG. 2 depicts an illustrative embodiment of a portal interacting with the communication system of FIG. 1;

FIG. 3 depicts an illustrative embodiment of a communication device utilized in the communication system of FIG. 1;

DETAILED DESCRIPTION

The present disclosure describes, among other things, illustrative embodiments of a femtocell provisioning system that can authenticate and further modify a QoS level or provide self diagnostics. Other embodiments are contemplated by the present disclosure.

One embodiment of the present disclosure includes a method rendering service to a femtocell which can include receiving from a gateway a message with a gateway identifier responsive to a femtocell establishing communications with the gateway. The method can also include identifying a subscriber account according to the gateway identifier and verifying from the subscriber account an availability of service for the femtocell, authenticating the femtocell according to a global positioning satellite (GPS) location coordinate and a femtocell identifier supplied by the femtocell, and rendering service to the femtocell upon authentication of the femtocell.

One embodiment of the present disclosure includes a femtocell comprising a controller operable to establish communications with a gateway and transmit authentication information to the gateway. The gateway transmits the authentication information and a gateway identifier to a remote server to authenticate the femtocell. The controller is also operable to detect enablement of services responsive to the remote server identifying a subscriber account according to the gateway identifier, and the remote server authenticating the femtocell by comparing the authentication information to information retrieved from the subscriber account.

Yet another embodiment of the present disclosure includes a portable communication device in communication with a femtocell comprising a controller operable to send location information to the femtocell and to communicate with a third party via the femtocell once the femtocell is enabled for communication services responsive to successfully being authenticated. The femtocell is operable to transmit to a remote service the location information from the portable communication device for authenticating the femtocell. The femtocell is also operable to cause the remote server to arbitrate Quality of Service (QoS) parameters with other devices sharing a broadband channel with the femtocell.

Figure 1:
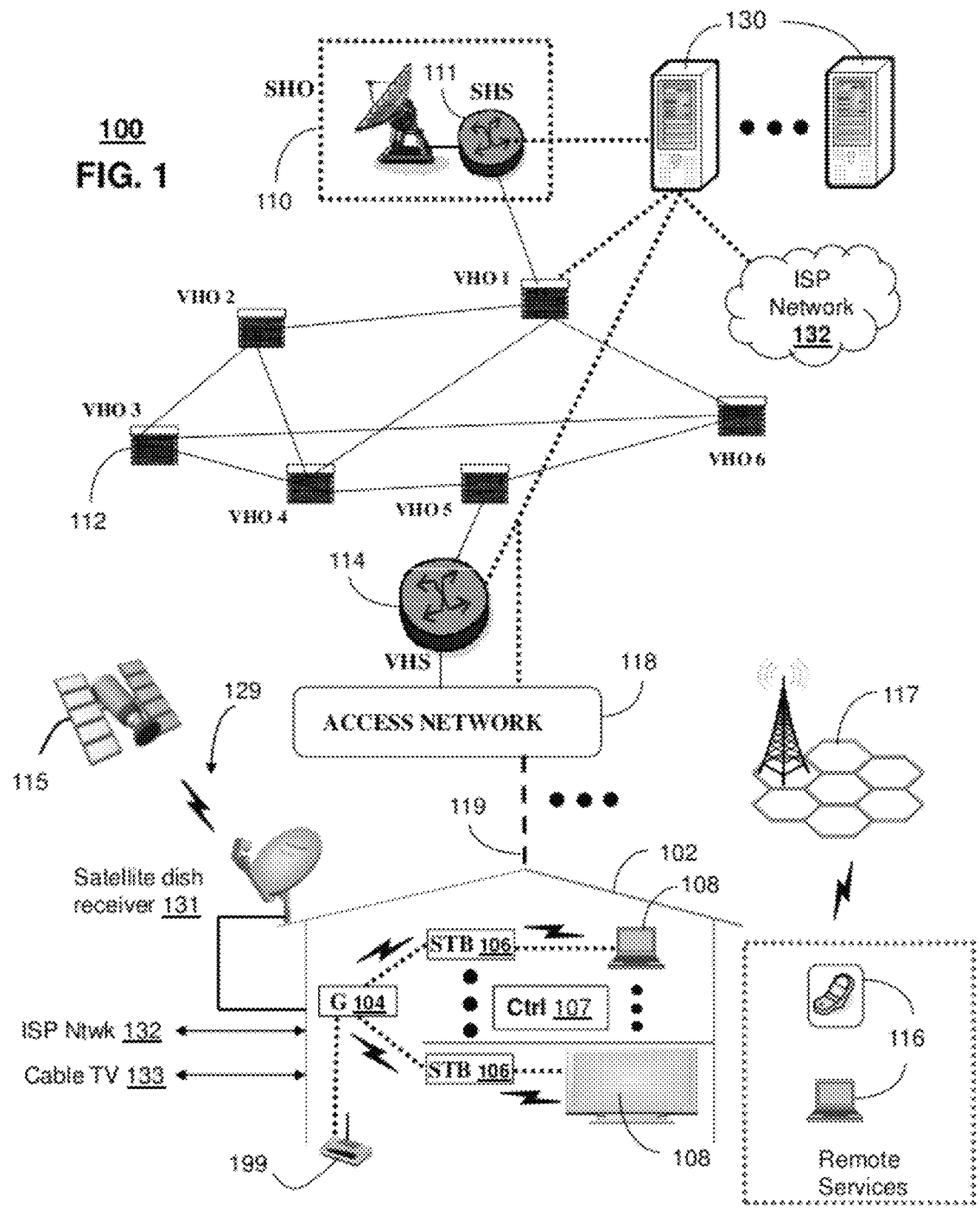
FIG. 1 depicts an illustrative embodiment of a communication systems that provides media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi). By way of these interfaces, unicast communications can also be invoked between the media processors 106 and subsystems of the IPTV media system for services such as video-on-demand (VoD), browsing an electronic programming guide (EPG), or other infrastructure services. Furthermore, the gateway can be in communication with a femtocell 199 operating in accordance with the various embodiments described herein.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can provide Internet, telephony, and interactive media services also.

It is contemplated that the present disclosure can apply to any present or next generation over-the-air and/or landline media content services system.

Some of the network elements of the IPTV media system can be coupled to one or more computing devices 130, a portion of which can operate as a web server for providing portal services over an Internet Service Provider (ISP) network 132 to wireline media devices 108 or wireless communication devices 116.

All forms of media services can be offered to media devices over landline technologies such as those described above. Additionally, media services can be offered to media devices by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

System 100 can also provide for all or a portion of the computing devices 130 to function as an authentication server (herein referred to as server 130). The server 130 can use common computing and communication technology to perform the function of authenticating or verifying that a femtocell 199 is appropriately configured and assigned to premises 102 in accordance with the embodiments. Server 130 can also be used to control or otherwise communicate with the residential gateway 104, the media processor 106 or other computing devices in building or premise 102. Illustrative embodiments of methods that can operate in portions of the devices of FIG. 1 are described further below.

FIG. 2 depicts an illustrative embodiment of a portal 202 which can operate from the computing devices 130 of the communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, or a personal catalog (such as personal videos, pictures, audio recordings, etc.) stored in the media processor 106. The portal 202 can also be used for provisioning Internet Multimedia Service (IMS) services, provisioning Internet services, provisioning cellular phone services, and so on. Illustrative embodiments of methods that can operate in portions of the portal 202 of FIG. 2 are described below.

FIG. 3 depicts an exemplary embodiment of a communication device 300. Communication device 300 can serve in whole or in part as an illustrative embodiment of the communication devices of FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 408 can be presented by way of the display 310.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in a communication systems 100 of FIG. 1 such as a gaming console and a media player. Illustrative embodiments of methods that can operate in portions of the communication device of FIG. 3 are described below.

The present disclosure contemplates a femtocell that can be automatically provisioned and authenticated by confirming service and location in a number of ways. Other aspects include dynamic QoS adjustments and diagnostics for troubleshooting. Due to the increased complexity of networks, "customer self-service" to troubleshoot or diagnose has become very formidable as more and more circuits with a bundle service such as wireless, VOIP, IPTV and high speed internet are assigned to Optical Fiber Networks. This presents a challenge which mandates a very unique and innovative solution that ensures that the "Customer Experience" can be maximized. Today the magnitude and enormity of this type of "end to end" testing has provided the telecom industry radically new challenges. In order to minimize costs associated with the maintenance of circuits assigned to various network equipment ports, a "self service" maintenance capability is offered herein to quickly isolate or resolve troubles on Network Elements and Home Network components. The "customer self service" automation provided herein can ensure that all services including wireless can be provisioned and tested "end to end".

In particular, the embodiments described herein help address one or more challenges involving femtocells. As alluded to above, provisioning can be complicated due to the complexity in networks and services being bundled. Nonetheless, embodiments herein would provide for automated provisioning that would allow a user to take a femtocell home and plug it in. In other words, embodiments herein would provide a plug and play experience for the consumer. Next, femtocell should automatically detect and provision neighbor lists to allow full mobility with a macro network Key. Provisioning should also entail maintaining security to protect both the network and the end consumer or customer. Other features can include dynamic QoS adjustments in view of bundled services on a network and self-diagnostics or troubleshooting on such bundled networks having the femtocell.

Figure 4:
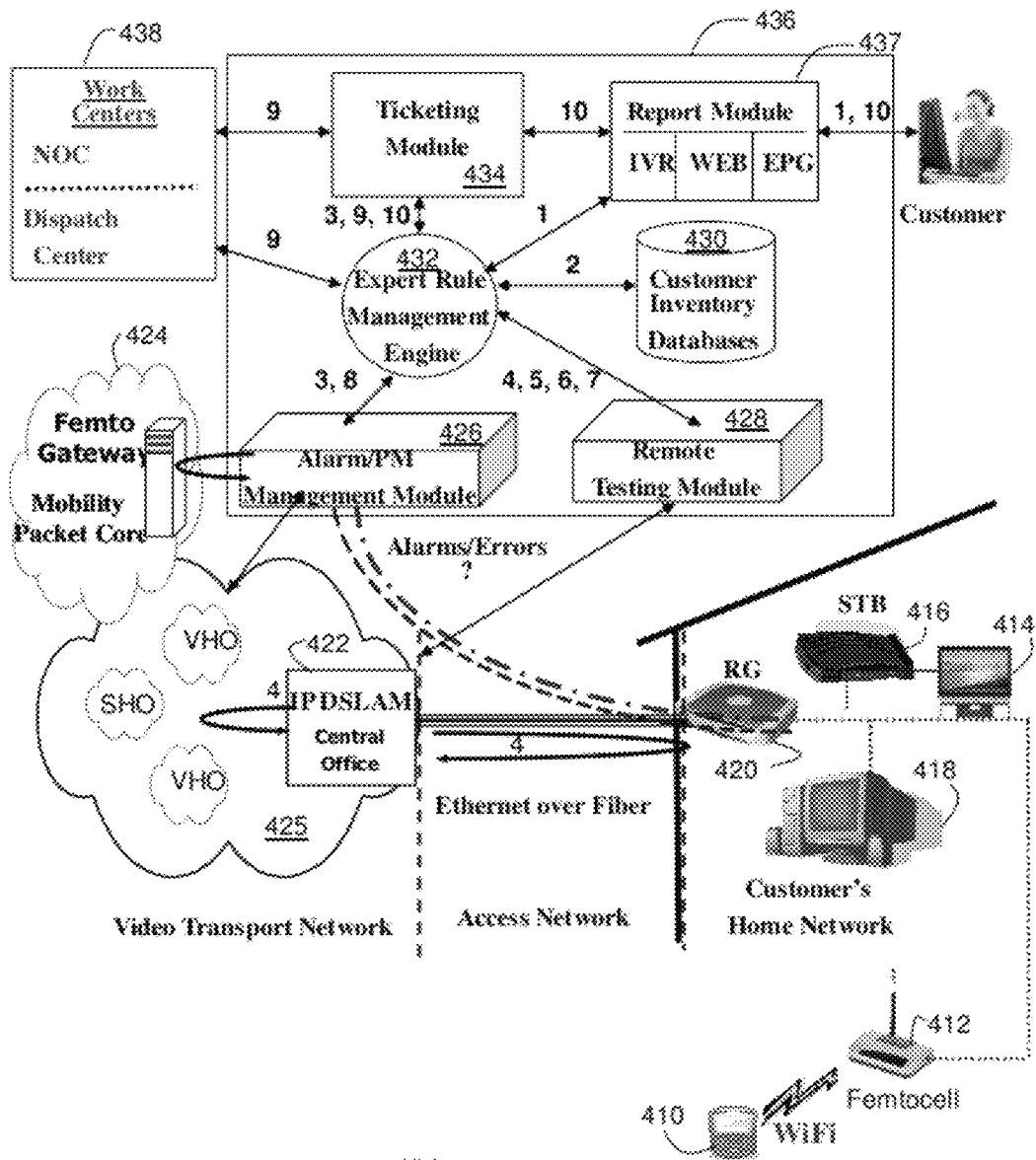
FIG. 4 depicts an illustrative embodiment of a communication system using a femtocell.

Referring to FIG. 4, a system or network 400 having a femtocell 412 coupled to a customer's home network can include a residential gateway 420 that provides media services through an STB 416 and display 414 or computer system 418. The network can further include numerous network elements including a video transport network 425 (having VHOs and SHOs and a IP DSLAM 422), and a Femto gateway 424 (having a mobility packet core). The Femto gateway 424 can communicate with a troubleshooting module 436 that can include an Expert Rule Management Engine 432 that interfaces with a number of elements including a ticketing module 434, a reporting module 437, a customer inventory database 430, a remote testing module 428, and an alarm management module 426. The Expert Rule Management engine 432 can also interface with work centers 438 (that can include a network operating center and a dispatch center) and an customer via the reporting module 437.

Operationally, the system 400 can for example following the annotated process of auto detecting or responding to a customer's request at step 1 and subsequently checking the customer's account status and configuration at step 2. An auto alarm or alert and ticket correlation is done to isolate possible problems due to a network outage at step 3. At step 4, the transport network and "Last Mile" can be auto tested and the IP DSLAM port can be bounced. Next, at steps 5-7, the femtocell status is checked, the home network connectivity is verified for sufficient bandwidth, and the Femtocell is automatically power cycled if necessary. At step 8, the system performs service restoration verification. If the verification fails, the system 400 creates a ticket and sends the ticket to the work center 438 and schedules a dispatch to fix a home network problem if required. At step 10, the system 400 can document resolution in a Ticket for customer reporting.

Figure 5:
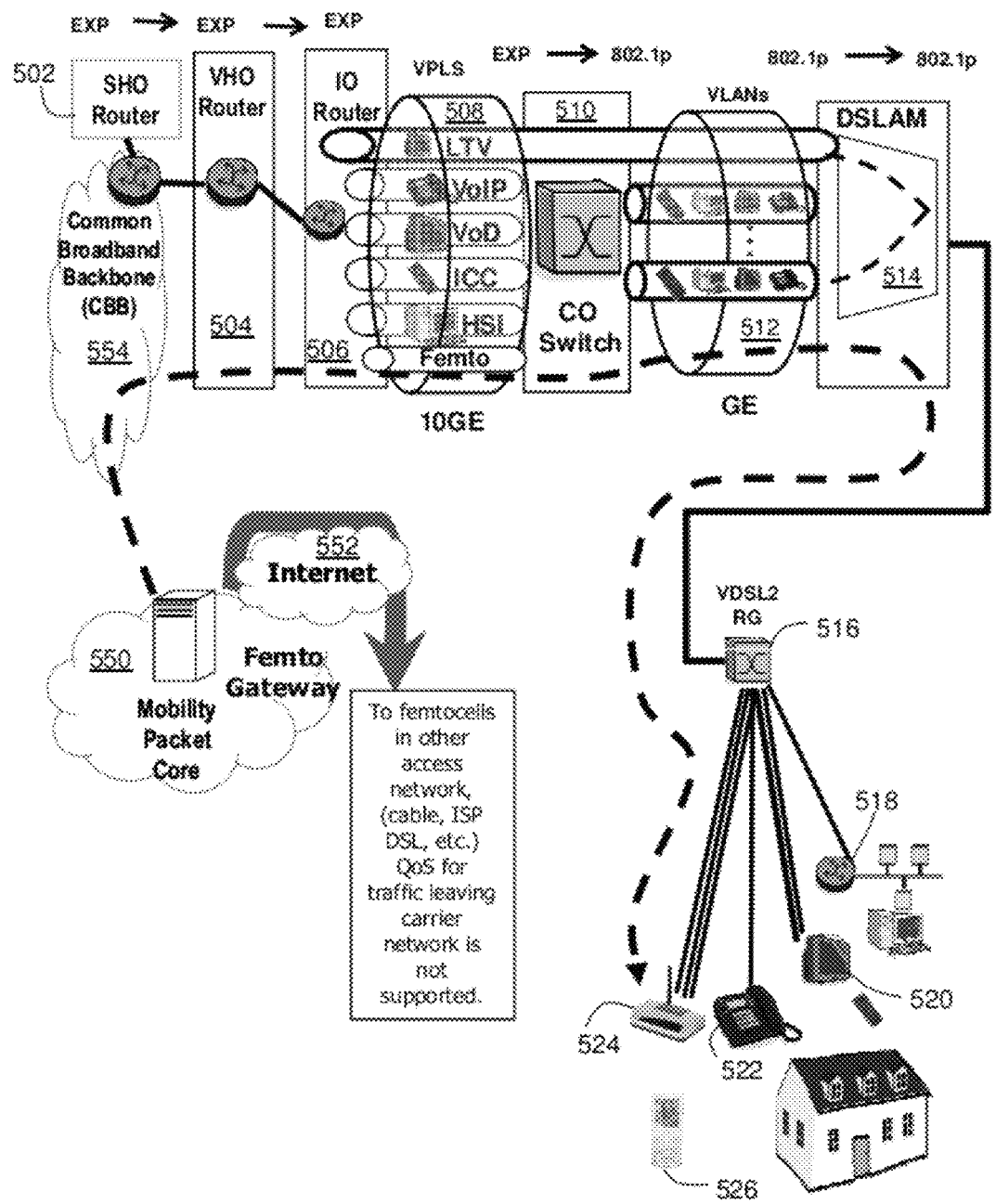
FIG. 5 depicts a downstream Quality of Service (QoS) model.
Figure 6:
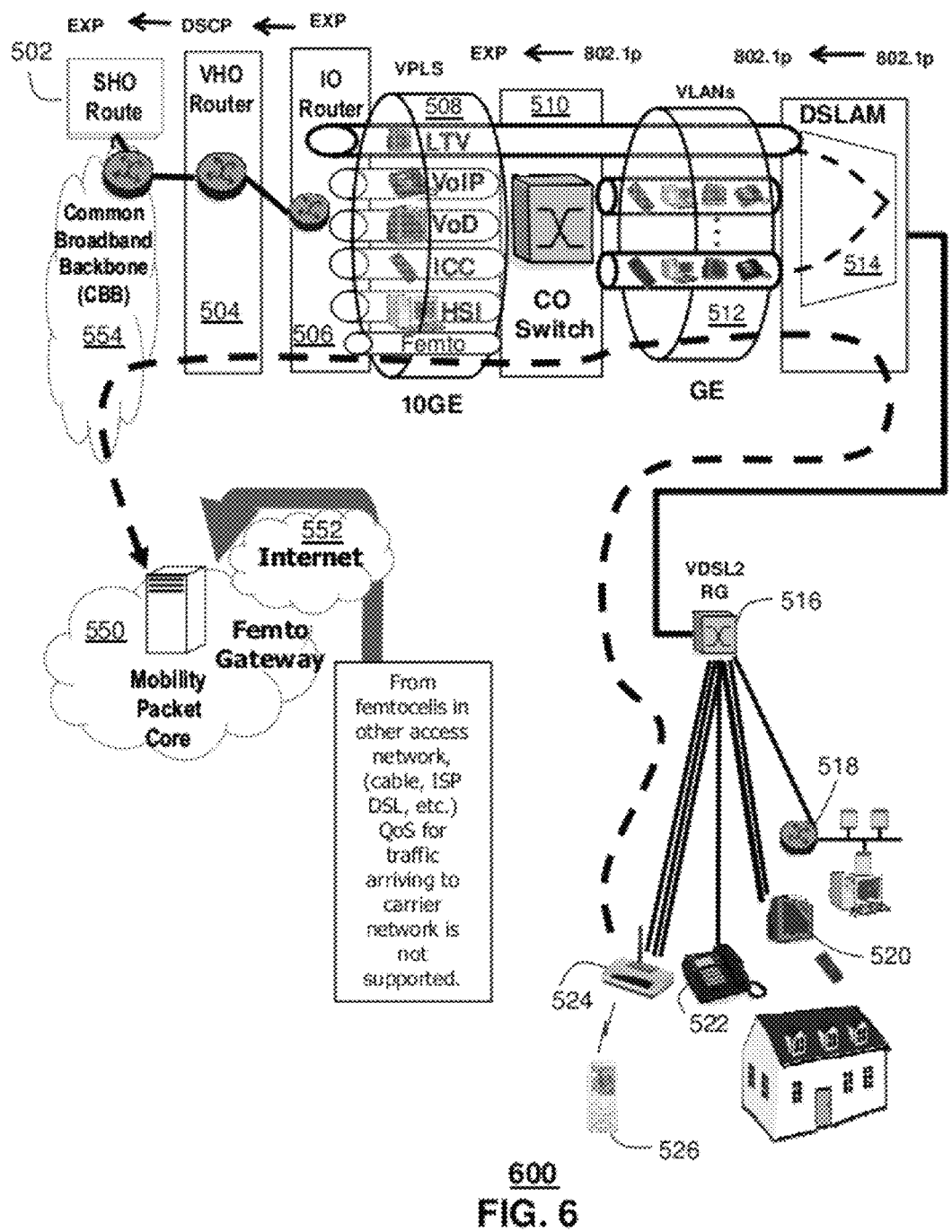
FIG. 6 depicts an upstream QoS model.

FIG. 5 and FIG. 6 illustrate QoS models 500 and 600 for downstream and upstream service respectively to and from a customer premise. The models 500 and 600 can include network elements that couple a Femto gateway 550 having a mobility packet core to a femtocell 524. The elements between the gateway 550 and the femtocell 524 can include a common broadband backbone (CBB) 554, an SHO router 502, a VHO router 504, an IO router 506 and a DSLAM 514. Between the IO router 506 and the DLSAM 514 can be a 10 Gigahertz Ethernet connection 508, a CO switch 510 and a 1 Gigahertz Ethernet connection 512. The DSLAM 514 further couples to a residential gateway 516 that enables multiple media services that can include Internet or high speed broadband service through router 518, Internet Protocol Television (IPTV) service through a STB and display 520, Voice-over-IP (VoIP) through a VoIP phone 522, or femtocell wireless network services through femtocell 524 and the mobile cellular phone 526. Note that the Femto gateway 550 can couple to or from other femtocells in other access networks through the Internet 552. Unless there are cross agreements between carriers of the other access networks and the carrier of network 500 or 600, the ability to provide QoS may be limited for traffic leaving or coming from outside networks since the system illustrated assumes that the broadband internet carrier and the wireless cellular carrier are the same carrier. Without contractual agreements in place, there may be no way control the QoS provided by the other access networks.

Operationally in the downstream model 500 of FIG. 5, the Femto Gateway 550 can mark up secure virtual private network (VPN) packets with Differentiated Services Code (Control) Point (DSCP) values. The IO router 504 can route traffic into VPLS and translate the DSCP marking to MPLS EXP-bits markings. The DSLAM 514 forwards all traffic downstream, honoring 802.1p markings and the per-customer VLAN based on IGMP snooping for IPTV multicasting. The CO switch 510 honors the MPLS EXP-bits marked traffic within the VPLS and maps into per-customer VLANs and marks 802.1p P-bits downstream to the DSLAM 514. The residential gateway 516 strips the received signal of P-bits, performs P-bits based priority scheduling and forwards DSCP marking to end devices.

In the upstream model 600 of FIG. 6, the femtocell 524 marks up secure VPN packets with DSCP. The residential gateway 516 will then remark the P-bits or DSCP value according to policy rules (e.g., destination address). The DSLAM 514 forwards all traffic upstream, honoring the 802.1p markings and the per-customer VLAN for IPTV IGMP multicasting response messages. The CO switch 510 maps per-customer VLANS and 802.1p P-bits to MPLS EXP-bits for upstream data. The IO router 506 then translates MPLS EXP-bits marking into DSCP marking.

Figure 7:
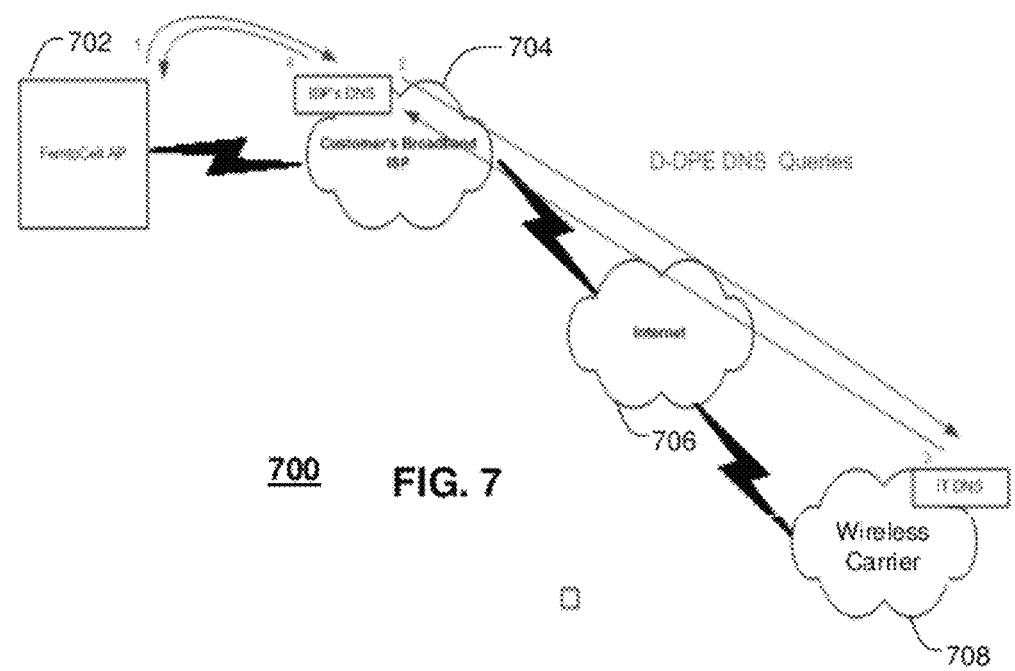
FIG. 7 depicts a Femtocell access point DNS call flow.

FIG. 7 illustrates a simplified femtocell access point network Domain Name System (DNS) call flow 700. Upon coupling a femtocell 702 to a customer's broadband network 704, the femtocell 702 can request that the residential gateway (RG) (within the nework 704) to start up and initiate authentication via 802.1X. The actual process can include numerous steps, but ultimately D-DPE DNS queries are made to the wireless carrier 708 via the Internet 706 and an address is assigned to the femtocell access point 702.

In one embodiment with reference to FIGS. 5-7, a DSLAM responds to 802.1X authentication request and the RG initiates an Extensible Authentication Protocol (EAP) session. The DSLAM proxies an EAP session to a server such as a RADIUS server. The RG and RADIUS server transact an EAP authentication. Radius attributes TBD (port). Depending on RADIUS attributes added by DSLAM, authentication of the RG may be conducted at this stage. Successful authentication results in the DSLAM opening the user's port. The RG then initiates a DHCP request. The DSLAM adds option 82 (shelf/slot/port/circuit ID) to a DHCP message. The IO Router relays DHCP request to a DHCP server. The DHCP server determines an IP address based on giaddr (Gateway IP Address) and option 82. The DHCP server may authenticate the RG (option 82/MAC) with communication between the DHCP server and the RADIUS server. DHCP server communicates accounting start/stop to RADIUS server. This may trigger a policy management push to network elements. The DHCP acknowledge is issued by the DHCP server. For security, the IO Router snoops the DHCP acknowledge (IP and MAC addresses) and installs ARP cache entry for the authenticated RG. For security, the CO Switch snoops the DHCP acknowledge (IP address) and installs an IP antispoofing filter for the authenticated RG. This allows any traffic from the user with the proper IP address to enter the network from this point in time. The RG receives DHCP acknowledge granting its IP address.

Figure 8:
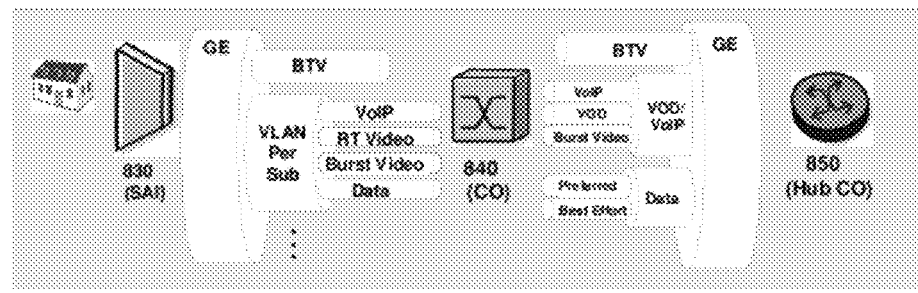
FIG. 8 depicts a QoS system used in the models of FIGS. 5 and 6.

Referring to network 800 represented in FIG. 8, the QoS functions in such a network can be further explained. Femto traffic can be treated as HSAI data which will be identified by 802.1p marking from the RG (upstream) and by DSCP marking of traffic from IS POP routers. A DSLAM 830 implements the QoS functions on the frame level. The DSLAM 830 is made of two main parts: line cards that host the DSL modems and do the traffic handling for the DSL links, and an aggregation function which gathers the traffic from the line cards.

The DSLAM 830 can have a distributed traffic handling architecture. The aggregation function solves the QoS before the upstream bottleneck, while the line cards implements the QoS functions necessary to solve the downstream bottleneck. Consequently, the aggregation function deals with aggregates while the line cards deal with the individual user or session concepts. Internally the DSLAM 830 is virtually non-blocking. Traffic segregation into QoS classes relies on the 802.1P-bits. In the SBC architecture it is assumed that customer frames arrive readily tagged on the DSL links. The DSLAM 830 assumes that the access network uses one common traffic class mapping convention. In other words, regardless of the VLAN, the P-bits have the same meaning all over the access network. Frames arriving downstream to the DSLAM 830 are assumed to be correctly marked.

The DSLAM 830 can segregate traffic into four traffic classes. These four traffic classes are available on all output interfaces, including the DSL links. Nevertheless, it is possible to give services all the eight possible code points, and it is possible to map them in any combination into the 4 output queues.

Regarding QoS on the aggregation function, the aggregation function has free Gigabit Ethernet (GE) ports available to connect the DSLAM 830 to the aggregation network and subtended systems.

It is possible to edit Weighted Round Robin (WRR) weights, so bandwidth distribution between the two data services that rely on elastic traffic (TCP) is editable, based on how many contracts of each type have been signed and what is the operator's policy for traffic class oversubscription. Link shaping can be set on each output interfaces on the aggregation function. These two functions however are not needed in the SBC architecture.

Regarding QoS on DSL interfaces, similar to the aggregation function, per DSL link a hierarchical scheduler is implemented with four traffic classes (voice, video, CL, BE) and optimized for the needs of different application types. In order to present operators with a consistent QoS story on both ADSL and EFM links—potentially hosted on the same DSLAM 830 system—the forwarding decision can be split in two: in case of ATM-based DSL links the downstream forwarding decision is first executed to find the outgoing link, then segregation into traffic classes based on Ethernet QoS is executed, and only when the correct scheduling decision was done on the frame layer is the second part of the forwarding decision done, namely stamping the correct VCI VPI numbers on the ATM cell. This way, future DLSLAM 830 systems featuring both EFM and ATM-based DSL links will have a consistent traffic handling architecture.

Each of the 4 queues can be programmed as Tail drop or RED, with fully editable queue sizes. The DSLAM 830 system provides queue and scheduler profiles to facilitate the consistent settings of several DSL links based on a typically small set of operator defined service packages.

Downstream traffic segregation per DSL link happens at line rate on the line cards. This way the DSLAM 830 guarantees that customers on different DSL links cannot adversely impact each other.

Figure 9:
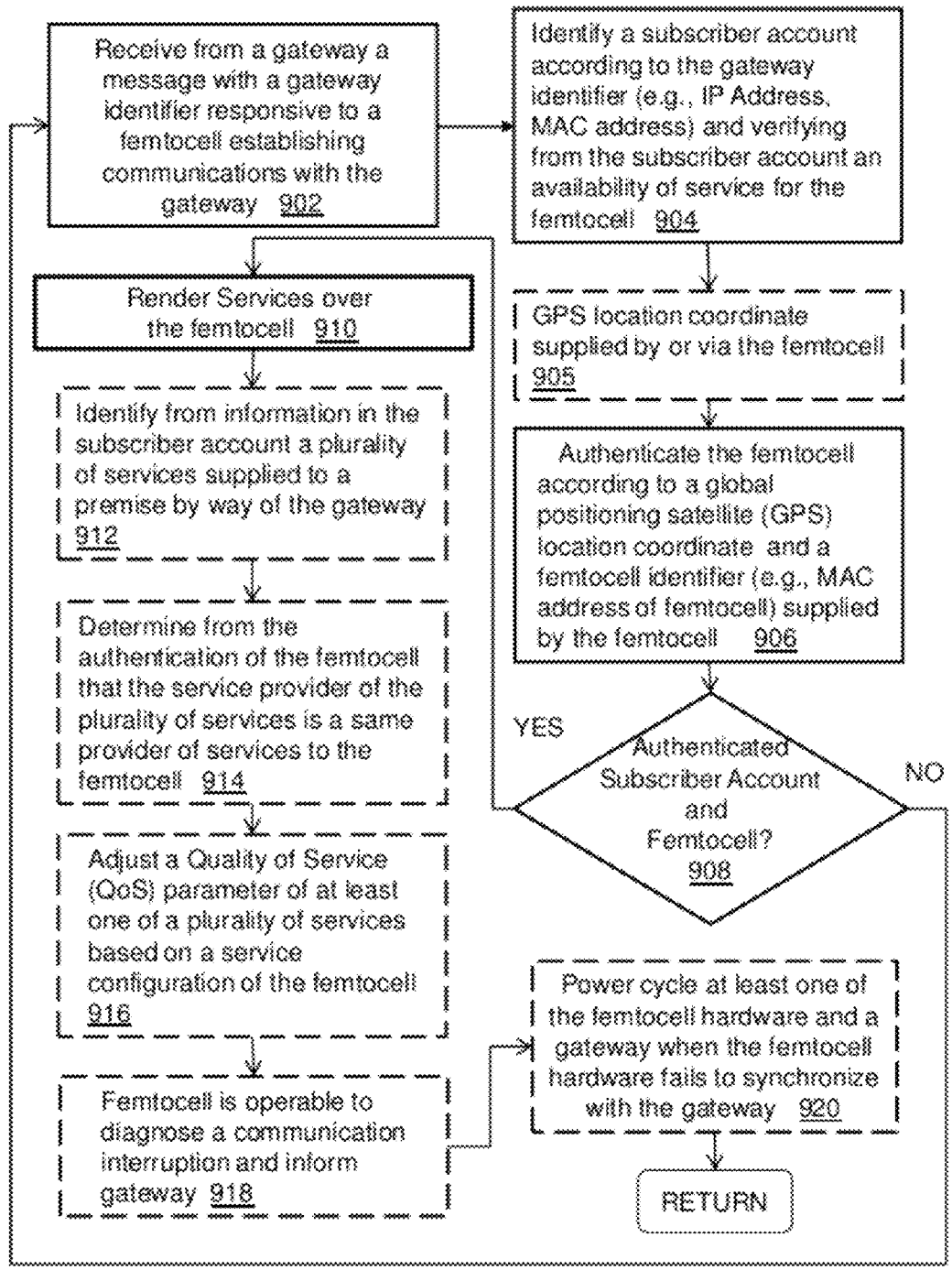
FIG. 9 depicts an illustrative embodiment of a method operating in portions of the systems described in FIGS. 1-8.

FIG. 9 depicts an illustrative method 900 that operates in portions of the devices of FIGS. 1-8. Method 900 can begin with step 902 in which the method receives from a gateway a message with a gateway identifier responsive to a femtocell establishing communications with the gateway. The method 900 at 904 identifies a subscriber account according to the gateway identifier and verifying from the subscriber account an availability of service for the femtocell. The gateway identifier can be an IP address or MAC address of the gateway for example. At 905, the method 900 can optionally obtain a Global Positioning Satellite (GPS) location coordinate. In one embodiment, the GPS location coordinate supplied by the femtocell can be obtained from GPS coordinates from a GPS receiver in the femtocell. In another embodiment, the GPS location coordinate supplied by the femtocell is obtained via the femtocell in response to a request from the gateway for location information during an authentication process.

At 906, the femtocell can be authenticated according to the GPS coordinate location and a femtocell identifier supplied by the femtocell. The femtocell identifier can be a MAC address of the femtocell. At decision block 908, if the subscriber account and femtocell are authenticated, then services are rendered over the femtocell at 910. If either of the subscriber account or the femtocell fail to be authenticated, the method can return to 902. At 912, the method 900 can identify from information in the subscriber account a plurality of services supplied to a premise by way of the gateway. At 914, the method 900 can determine from the authentication of the femtocell that the service provider of the plurality of services is a same provider of services to the femtocell. The method can communicate between the femtocell and a base station of the cellular communication system over a real-time protocol or (RTP) channel.

After authentication, the method can optionally adjust a quality of service (QoS) parameter of at least one of a plurality of services at 916 based on service configuration of the femtocell (for example, by determining existing service provided for a subscriber account and adjusting at least one service based on femto channel needs and other service needs). At 918, the method can also diagnose a communication interruption and inform the gateway. The femtocell can be operable to inform the gateway of the communication interruption to establish a trouble ticket. The method can auto diagnose the femtocell when the femtocell detects a problem. Auto-diagnosing the femtocell can be done for example by having the femtocell detect a problem and informing a gateway or set-top box (STB) of the problem where a trouble ticket is automatically created. The method 900 can also include at 920 power cycling at least one of the femtocell hardware and a gateway when the femtocell hardware fails to synchronize with the gateway.

An interruption at 918 can also entail the detection of the installation of a femtocell in a network and a corresponding QoS mapping for all or some of the network device parameters within the network. The interruption at 918 can also involve the detection of a Long Term Evolution (LTE) device such as a "4G (LTE)" cellular phone or an Universal Mobile Telecommunications System (UMTS) device such as a "3G" cellular phone at the femtocell. The detection of the LTE device can enable the dynamic mapping of QoS for each or a portion of the "pipes" (e.g., LTV, VoIP, VoD, ICC, HSI, and Femto) illustrated in FIGS. 5 and 6.

Operationally, the 3G (UMTS) or 4G (LTE) device can send a QoS Class Identifier (QCI) or a Traffic Class to the femtocell which indicates the kind of communication that is about to take place. The QCI can indicate several types of communication such as voice and data communications. Note that voice and data can be simultaneous in an LTE system where voice and data are both packet switched. Voice can have a higher priority while data can have a lower priority depending on the type of data communication. In the case of data, emails can have a very low priority while video can have a very high priority, but still typically lower than a voice data call. In 4G (LTE), the QCI can take on 9 different values, and these values can be mapped into a smaller number of classes in the wireline portion of the network. Not that in 3G (UMTS), four (4) Traffic Classes are defined to support QoS. Although 9 QCI values and 4 Traffic Classes are described, the embodiments herein are not necessarily limited thereto.

Referring to FIG. 6, when a femtocell receives a QCI from an LTE device, the femtocell can map the QCI information upstream to other network devices such as the RG (516), VPLS (508) up to the Common Broadband Backbone 554. The individual "pipes" providing bandwidth for various services with the VPLS 508 "may" be adjusted based on the QCI sent by the LTE device. Accordingly, LTE devices can lead to dynamic QoS adjustments of the "pipes" or individual pathways in 508.

The Femtocell (also known as the Femtocell Access Point (FAP)) provides access to User Equipment (UE) such as the device 410 shown in FIG. 4 or the cell phone 526 shown in FIG. 5. The FAP is supports the same Radio Frequency (RF) technology that the UE uses in macro cell access. Several major components relating to the Femtocell are worth noting: the Femtocell (FAP) itself, the Home Network, Wireline Access, the Femtocell Gateway, and the remainder of the mobility network in a CBB network. All services receive different priority (QoS) treatments based on a Service Level Agreement (SLA).

The mapping when UEs access Femtocells include the following interfaces: (a) Between the UE and the Femtocell (QoS is implemented in the RF domain); and (b) Between the Femtocell and the RG/MAG (the Femtocell will connect to the RG/MAG via a wireline Ethernet connection; e.g., wheret wireless connectivity would not be used.

Transport to the 3G/4G Mobility core can be for example via the RG to Access network via the DSLAM with LAN priority using high-speed Ethernet interfaces or via the Access network to CBB via the CO and IO (where each IP packet will be marked using its DSCP field to provide differentiated service treatment.

As discussed above, the QCI (LTE of 4G) or Traffic Class (UMTS of 3G) of a radio bearer determines the priority of the packets that flow on it. However, multiple bearers can be multiplexed onto an Internet Security (IPSec) tunnel, and the Differentiated Services Code Point (DSCP) value of each IPSec packet can be marked consistent with the priority of the bearer. Because the UE is not tied to a particular FAP, both the Femtocell and the RG/MAG will need to mark the packets in a manner consistent with the network's DSCP scheme. The Femtocell is uniquely positioned to be able to distinguish between packets that are voice and those that belong to a type of walled garden traffic, and the Femtocell will mark them appropriately. Upstream, the packets would be given priority based on the markings. Each tunneled packet can be assigned so its DSCP will correspond to the wireless class (e.g., indicated by QCI) of its associated bearer.

A rule set for Mapping of Femtocell Markings with QoS-Aware Access to support wireline and 3G networks can entail QoS requirements for Voice that are different than those for Internet traffic. Walled Garden applications are expected to have requirements somewhere between the two, depending on the application. The ability to protect Voice traffic from being delayed by other traffic is of concern, particularly for low bandwidth upstream access. Walled Garden applications may also need some preferential treatment, depending on the application. For instance, streaming video could be affected by Internet traffic.

Figure 10:
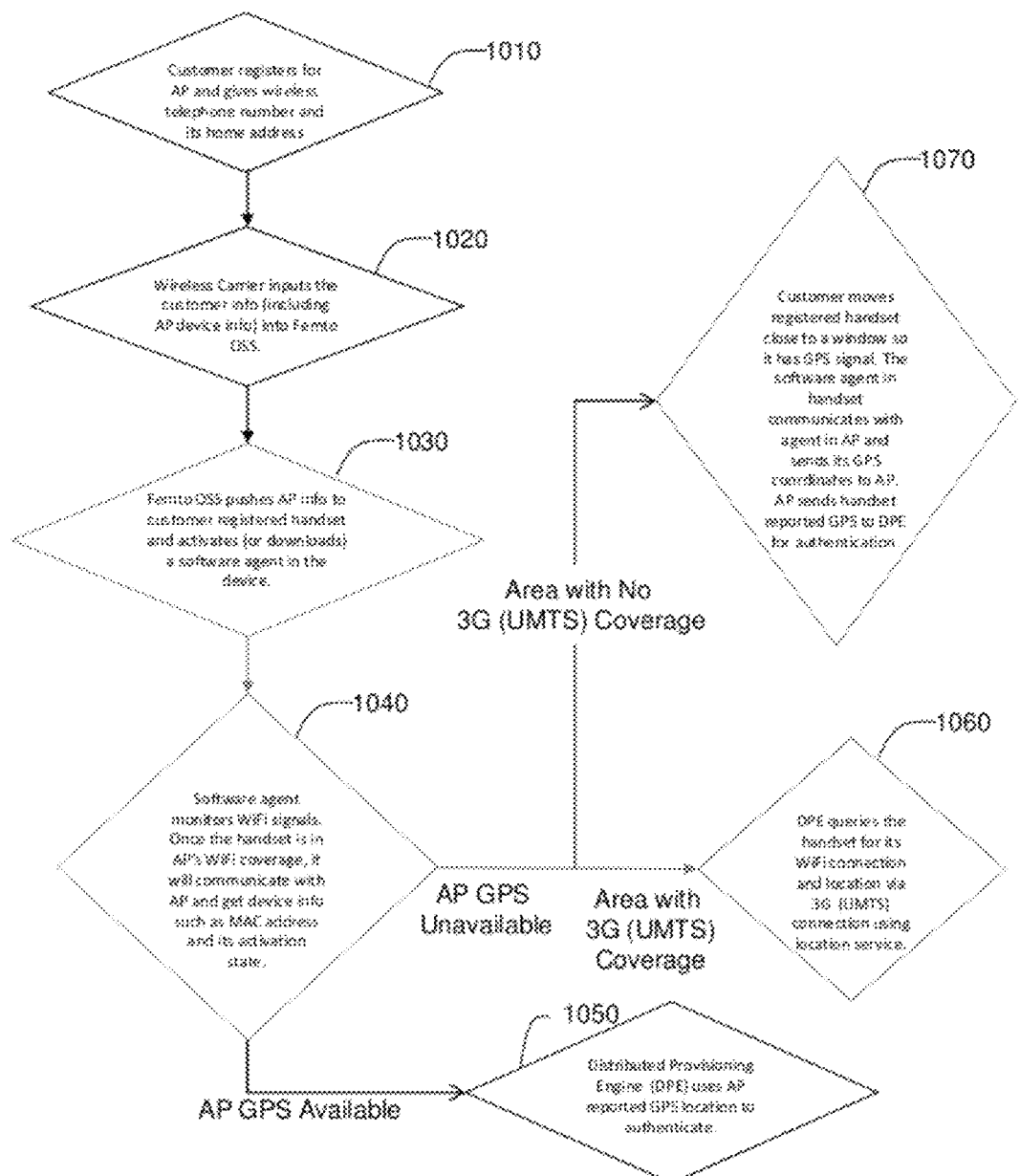
FIG. 10 depicts an illustrative embodiment of a method operating in portions of the systems describes in FIGS. 1-8 with regard to the femtocell and a handset.

In yet another embodiment with reference to FIG. 10, a method 1000 involving a mobile handset or cellular phone can entail a customer registering for an access point (AP) and provides a wireless telephone number and their home address at 1010. The wireless carrier can input the customer information (including the AP device information) into a Femto OSS at 1020. The FEMO pushes the AP information to a customer registered handset and activates (or downloads) a software agent in the device at 1030. At 1040, the software agent monitors WiFi signals. Once the handset is in AP's WiFi coverage, it can communicate with the AP and get device information such as MAC address and its activation state. If the AP GPS location data is available, then the method 1000 at 1050 the Distributed Provisioning Engine (DPE) uses access point reported GPS location to authenticate. If the AP GPS information is unavailable and the area has 3G (UMTS) coverage, then the DPE queries the handset for its WiFi connection and location via 3G (UMTS) connection using location service at 1060. If the area has no 3G (UMTS) coverage, then the customer at 1070 moves registered handset close to a window so it has GPS signal. The software agent in can communicate with agent in AP and sends its GPS coordinates to AP. The AP sends handset reported GPS to DPE for authentication Upon reviewing the aforementioned embodiments, it would be evident to an artisan with ordinary skill in the art that said embodiments can be modified, reduced, or enhanced without departing from the scope and spirit of the claims described below.

Other suitable modifications can be applied to the present disclosure without departing from the scope of the claims below. Accordingly, the reader is directed to the claims section for a fuller understanding of the breadth and scope of the present disclosure.

Figure 11:
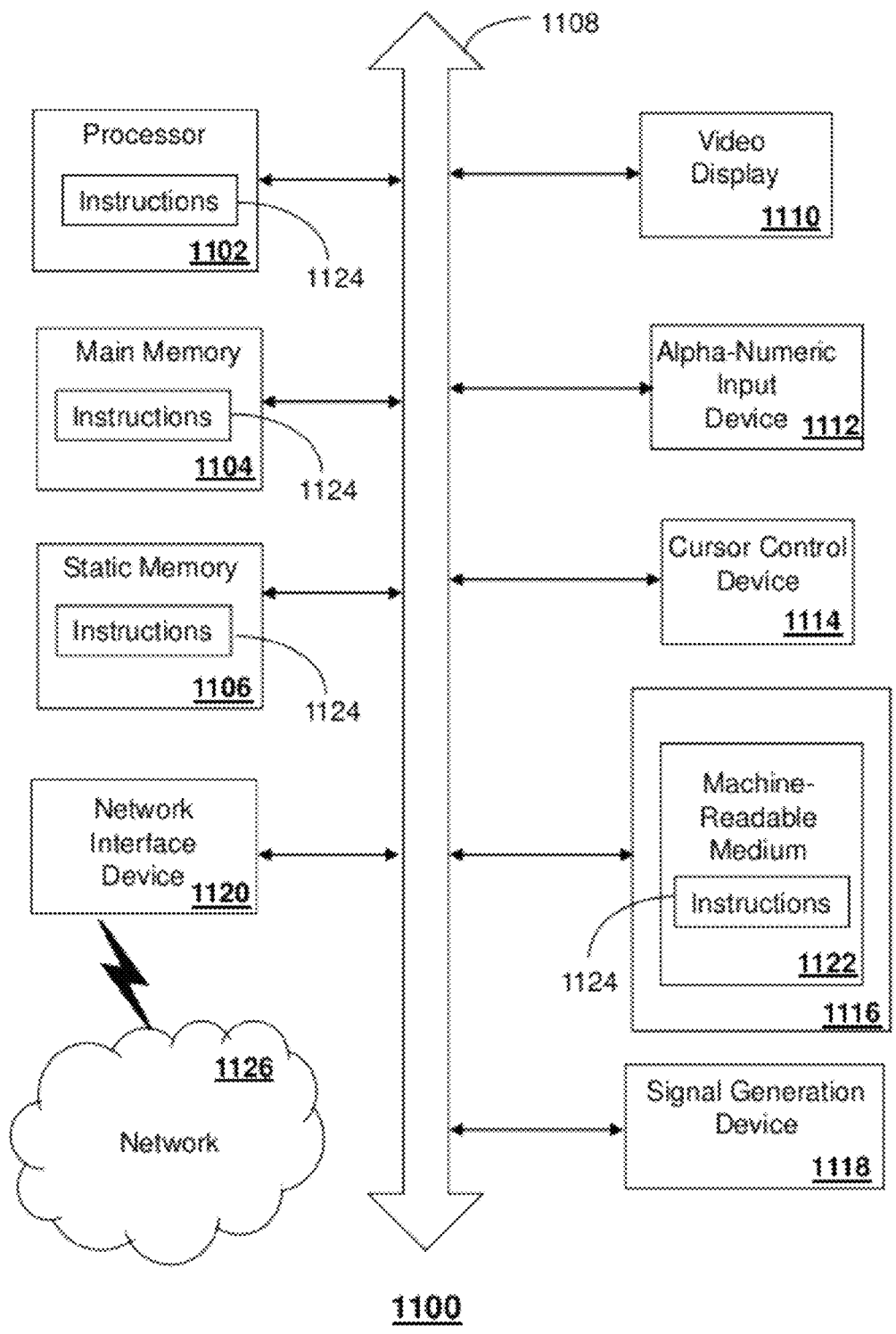
FIG. 11 is a diagrammatic representation of a machine in the form of a computer system within which a set of instructions, when executed, may cause the machine to perform any one or more of the methodologies discussed herein.

FIG. 11 depicts an exemplary diagrammatic representation of a machine in the form of a computer system 1100 within which a set of instructions, when executed, may cause the machine to perform any one or more of the methodologies discussed above. The machine can operate, for example, as the mobile device 116, the media processor 106, the gateway 104, the remote server 116, or combinations thereof. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 704 and a static memory 1106, which communicate with each other via a bus 708. The computer system 1100 may further include a video display unit 1110 (e.g., a liquid crystal display (LCD), a flat panel, a solid state display). The computer system 1100 may include an input device 1112 (e.g., a keyboard), a cursor control device 1114 (e.g., a mouse), a disk drive unit 716, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a system comprising a processor, a wireless identifier from a wireless phone of a user;
   determining, by the system, femtocell information regarding a femtocell of the user;
   providing the femtocell information to the wireless phone, wherein device information from the femtocell is obtained by the wireless phone;
   using the device information and GPS location data to authenticate the femtocell;
   receiving, by the system, from a gateway a message with a gateway identifier responsive to the femtocell establishing communications with the gateway;
   identifying, by the system, a subscriber account according to the gateway identifier and verifying from the subscriber account an availability of a service for the femtocell corresponding to the subscriber account;
   authenticating, by the system, the femtocell according to a global positioning satellite location coordinate and a femtocell identifier supplied by the femtocell; and
   rendering, by the system, the service to the femtocell upon authentication of the femtocell,
   wherein the service comprises assigning a respective one of a plurality of different service levels to each packet forwarded by the femtocell to the gateway responsive to a determination by the femtocell of a content of each packet.

2. The method of claim 1, wherein the gateway identifier is a static Internet protocol address of the gateway, and wherein the GPS location data is obtained from the wireless phone.

3. The method of claim 1, wherein the gateway identifier is a media access control address of the gateway.

4. The method of claim 1, wherein the global positioning satellite location coordinate supplied by the femtocell is obtained from global positioning satellite coordinates from a global positioning satellite receiver in the femtocell.

5. The method of claim 1, wherein the global positioning satellite location coordinate supplied by the femtocell is obtained via the femtocell in response to a request from the gateway for location information during an authentication process.

6. The method of claim 1, wherein the femtocell identifier is a media access control address of the femtocell.

7. The method of claim 1, comprising adjusting, by the system, a quality of service parameter of one of a plurality of services based on a service configuration of the femtocell, and based on a quality of service class identifier received from a long term evolution device in communication with the femtocell.

8. The method of claim 1, comprising:
   identifying, by the system, from information in the subscriber account a plurality of services supplied to a premise by way of the gateway, wherein the subscriber account is associated with a service provider;
   determining, by the system, from the authentication of the femtocell that the service provider of the plurality of services is a same provider of services to the femtocell; and
   responsive to the determination, adjusting, by the system, quality of service parameters for the plurality of services to accommodate service rendered to the femtocell.

9. The method of claim 1, wherein the method comprises establishing, by the system, communications between the femtocell and a base station of cellular communication system over a real-time protocol channel.

10. The method of claim 1, wherein the femtocell is operable to diagnose a communication interruption.

11. The method of claim 10, wherein the femtocell is operable to inform the gateway of the communication interruption to establish a trouble ticket.

12. The method of claim 11, wherein the method comprises power cycling, by the system, one of the femtocell, the gateway, or the femtocell and the gateway when the femtocell fails to synchronize with the gateway.

13. A device comprising:
   a memory that stores executable instructions; and
   a processor in communication with the memory, wherein the processor responsive to executing the instructions, facilitates performance of operations comprising:
   receiving a wireless identifier from a wireless phone of a user;
   determining femtocell information regarding a femtocell of the user;
   providing the femtocell information to the wireless phone, wherein device information from the femtocell is obtained by the wireless phone;
   using the device information and GPS location data to authenticate the femtocell;
   receiving from a gateway a message with a gateway identifier responsive to the femtocell establishing communications with the gateway;
   identifying a subscriber account according to the gateway identifier and verifying from the subscriber account an availability of a service for the femtocell corresponding to the subscriber account;
   authenticating the femtocell according to a global positioning satellite location coordinate and a femtocell identifier supplied by the femtocell; and
   rendering the service to the femtocell upon authentication of the femtocell,
   wherein the service comprises assigning a respective one of a plurality of different service levels to each packet forwarded by the femtocell to the gateway responsive to a determination by the femtocell of a content of each packet.

14. The device of claim 13, wherein the processor, responsive to executing the instructions, facilitates performance of operations comprising:

identifying from information in the subscriber account a plurality of services supplied to a premise by way of the gateway, wherein the subscriber account is associated with a service provider;

determining from the authentication of the femtocell that the service provider of the plurality of services is a same provider of services to the femtocell; and responsive to the determination, adjusting quality of service parameters for the plurality of services to accommodate service rendered to the femtocell.

15. The device of claim 13, wherein the femtocell is operable to diagnose a communication interruption.

16. The device of claim 15, wherein the femtocell is operable to inform the gateway of the communication interruption to establish a trouble ticket.

17. A non-transitory machine-readable storage medium, comprising executable instructions which, responsive to being executed by a processor, facilitate performance of operations comprising:

receiving a wireless identifier from a wireless phone of a user;

determining femtocell information regarding a femtocell of the user;

providing the femtocell information to the wireless phone, wherein device information from the femtocell is obtained by the wireless phone;

using the device information and GPS location data to authenticate the femtocell;

receiving from a gateway a message with a gateway identifier responsive to the femtocell establishing communications with the gateway;

identifying a subscriber account according to the gateway identifier and verifying from the subscriber account an availability of a service for the femtocell corresponding to the subscriber account;

authenticating the femtocell according to a global positioning satellite location coordinate and a femtocell identifier supplied by the femtocell; and rendering the service to the femtocell upon authentication of the femtocell, wherein the service comprises assigning a respective one of a plurality of different service levels to each packet forwarded by the femtocell to the gateway responsive to a determination by the femtocell of a content of each packet.

18. The non-transitory machine-readable storage medium of claim 17, comprising instructions which when executed by processor cause the processor to perform operations comprising adjusting a quality of service parameter of one of a plurality of services based on a service configuration of the femtocell, and based on a quality of service class identifier received from a long term evolution device in communication with the femtocell.

19. The non-transitory machine-readable storage medium of claim 17, comprising instructions which when executed by processor cause the processor to perform operations comprising:

identifying from information in the subscriber account a plurality of services supplied to a premise by way of the gateway, wherein the subscriber account is associated with a service provider;

determining from the authentication of the femtocell that the service provider of the plurality of services is a same provider of services to the femtocell; and responsive to the determination, adjusting quality of service parameters for the plurality of services to accommodate service rendered to the femtocell.

20. The non-transitory machine-readable storage medium of claim 17, wherein the femtocell is operable to diagnose a communication interruption.

21. The non-transitory machine-readable storage medium of claim 20, wherein the femtocell is operable to inform the gateway of the communication interruption to establish a trouble ticket.

* * * * *